United States Patent [19]

Padget et al.

[11] Patent Number: 4,543,387
[45] Date of Patent: Sep. 24, 1985

[54] AQUEOUS LATEX COPOLYMER COMPOSITIONS

[75] Inventors: John C. Padget, Cheshire; Donald H. McIlrath, Liverpool, both of England

[73] Assignee: Imperial Chemical Industries PLC, London, England

[21] Appl. No.: 577,882

[22] Filed: Feb. 7, 1984

[30] Foreign Application Priority Data

Feb. 21, 1983 [GB] United Kingdom ............... 8304748
Jul. 28, 1983 [GB] United Kingdom ............... 8320386

[51] Int. Cl.⁴ .................................................. C08L 33/00
[52] U.S. Cl. ............................ 524/523; 524/527; 524/519; 524/522
[58] Field of Search ................ 524/523, 519, 522, 527

[56] References Cited

U.S. PATENT DOCUMENTS

| | | |
|---|---|---|
| 2,976,203 | 3/1961 | Young et al. . |
| 2,976,204 | 3/1961 | Young et al. . |
| 3,222,419 | 12/1965 | Jubilee . |
| 3,547,852 | 12/1970 | Burke . |
| 3,787,232 | 1/1974 | Mikofalvy et al. ............... 117/138.8 |
| 4,057,527 | 11/1977 | Columbus . |
| 4,130,528 | 12/1978 | Chen . |
| 4,280,942 | 7/1981 | Green . |
| 4,341,679 | 7/1982 | Burgess et al. ....................... 428/500 |

FOREIGN PATENT DOCUMENTS

| | | |
|---|---|---|
| 2906118 | 8/1980 | Fed. Rep. of Germany . |
| 1445541 | 12/1966 | France . |
| 48-68627 | 9/1973 | Japan ................................... 524/523 |
| 961676 | 6/1964 | United Kingdom . |
| 1459843 | 12/1976 | United Kingdom . |
| 1557289 | 12/1979 | United Kingdom . |

OTHER PUBLICATIONS

Lamination by Arthur Hirsch, Handbook of Adhesives, Edited by Irving Skeist, 1st Ed., Van Nostrand Reinhold Co.
Industrial Adhesives and Sealants, Edited by B. S. Jackson, Hutchinson Benham, London.
High Performance Water Borne Laminating Adhesives by Roger J. Isbister et al., Proc. Tappi Paper Synth. Conf., Atlanta, 1982.

Primary Examiner—Joseph L. Schofer
Assistant Examiner—N. Sarofim
Attorney, Agent, or Firm—Cushman, Darby & Cushman

[57] ABSTRACT

Aqueous latex composition for use as a contact adhesive comprising a copolymer A and a copolymer B where A is an amorphous copolymer which comprises units of certain selected monomers preferably including vinylidene chloride, an internally plasticizing monomer like 2-ethylhexyl acrylate, optionally vinyl chloride, and optionally a copolymerizable acid, and has Tg within the range $-50°$ to $<0°$ C., and B is a crystalline polymer which comprises units of vinylidene chloride and preferably at least one of an alkyl acrylate, alkyl methacrylate and vinyl chloride, and optionally a copolymerizable acid, and has a Tg of not more than 30° C.

31 Claims, No Drawings

AQUEOUS LATEX COPOLYMER COMPOSITIONS

The present invention relates to an aqueous latex copolymer composition which is particularly suitable for the provision of a contact adhesive.

A contact adhesive is a substance which when coated on two substrates to be bonded enables a strong bond to be formed between the substrates on and after initial contact at ambient temperature without the requirement of any sustained pressure or setting time. The contact adhesive is applied to each substrate dissolved or dispersed in a liquid medium and the solutions or dispersions allowed to dry on each substrate before the contact bonding is effected.

In the past, contact adhesives have usually been applied as solvent-based compositions, i.e. in compositions wherein the adhesive substance has been dissolved in an organic liquid solvent. However, in recent years attention has been focussed on the toxicity, flammability and pollution problems associated with such systems. This has stimulated a desire to employ systems where the contact adhesive is less hazardously applied as an aqueous-based composition, i.e. in a composition wherein the adhesive substance is dispersed in water.

Currently, aqueous-based contact adhesive compositions appear to be mainly of two types: Neoprene or modified Neoprene-type compositions and acrylate-type compositions. Examples of the former type are described in U.S. Pat. No. 4,130,528 while examples of the latter type are described in U.S. Pat. Nos. 2,976,203, 2,976,204, 4,057,527, 4,280,942, and British Pat. No. 1459843. The search for new aqueous-based contact adhesive compositions nevertheless continues with the objective of obtaining an improved balance of properties such as contactability, mature bond strength and high temperature creep performance.

We have now discovered that certain aqueous latex copolymer compositions have excellent utility as contact adhesive compositions, whereby such compositions are readily prepared for customer use and yield strong, shear and peel stable bonds.

According to the present invention there is provided an aqueous latex composition comprising at least one copolymer A and at least one copolymer B, characterised in that:

A is an amorphous copolymer comprising polymerised units (a) of at least one monomer selected from alkyl acrylates and methacrylates having 1 to 12 carbon atoms in the alkyl group, alkoxyalkyl acrylates and methacrylates having 1 to 12 carbon atoms in the alkyl group, vinylidene chloride, acrylonitrile, styrene, vinyl acetate and vinyl ethyl ether, said copolymer A including polymerised units of at least one internally plasticising comonomer, and which copolymer has a Tg within the range 50 to <0° C.; and B is a crystalline copolymer comprising polymerised units of vinylidene chloride, and which copolymer has a Tg which is not more than 30° C.;

and wherein the dry weight ratio of the at least one copolymer A: the at least one polymer B is in the range from 95:5 to 10:90.

The copolymer A may optionally comprise polymerised units of vinyl chloride and may optionally comprise polymerised units of at least one copolymerisable ethylenically unsaturated acid.

The copolymer B generally comprises polymerised units of vinylidene chloride and polymerised units (b) of at least one comonomer selected from alkyl acrylates and methacrylates having 1 to 12 carbon atoms in the alkyl group, alkoxyalkyl acrylates and methacrylates having 1 to 12 carbon atoms in the alkyl group, vinyl chloride, styrene, acrylonitrile, vinyl acetate, vinyl ethyl ether, ethylene, cis and trans 1,3-butadiene, cis and trans isoprene, cis and trans chloroprene, 1-decene, 1-pentene and 1-octene.

The copolymer B may optionally comprise polymerised units of at least one copolymerisable ethylenically unsaturated acid.

There is also provided according to the invention the use of an aqueous latex composition as defined above as a contact adhesive-forming composition. In accordance with the conventional method of contact bonding, such use is generally effected by coating two substrates to be bonded with the said aqueous latex composition, allowing the aqueous coating on each substrate to dry, and bringing the coated substrates into contact usually at ambient temperature and usually without any sustained pressure to effect contact bonding.

By Tg is meant the glass transition temperature.

The aqueous latex composition of the invention provides polymeric layers which (after drying) possess tack (contactibility) and also (after contacting) yield a bond having excellent cohesive strength with acceptably low creep at elevated temperatures (e.g. up to 50° C. or above). If copolymer A is used alone, while contactability is usually acceptable the creep at an elevated temperature of the resulting bond may be high. If copolymer B is used alone, contactability is normally non-existent (presumably because of its cystalline nature). The combination of copolymer B with copolymer A as per the invention surprisingly allows good contactability imparted by A to be retained while improving, often significantly, its creep performance at an elevated temperature, neither copolymer A nor copolymer B in the composition deleteriously affecting to an unacceptable extent the advantageous properties of the other. Additionally, the use of copolymer B can, surprisingly, sometimes also enhance the contactability of copolymer A as well as improving its high temperature creep performance. Furthermore a single copolymer possessing the same overall composition would not possess the same excellent combination of properties.

An essential feature of the present invention is that the copolymer B provides a resin which is partially crystalline (with greater than 5% crystallinity and more usually greater than 15% crystallinity), being either crystalline in the latex particles or crystallising on and/or after removal of the aqueous carrier—as for example on and/or after bond formation—and particularly at ambient temperature. This provides a bond with very good low creep characteristics. It is to be understood that the crystallisation may often be slow. The copolymer A is amorphous (with less than 5% and more usually substantially zero crystallinity) being non-crystalline while in the latex and not crystallising on and/or after removal of the aqueous carrier—as for example on and/or after bond formation.

The weight ratio of the at least one copolymer A: the at least one copolymer B is from 95:5 to 10:90. The preferred range is 90:10 to 10:90, particularly 80:20 to 20:80 (with 75:25 to 25:75 being a typical range in practice).

The aqueous latex compositions of the invention normally comprise only one copolymer A and only one copolymer B, although it is within the scope of the invention to include more than one copolymer A and/or more than one copolymer B.

The disposition of copolymers A and B in the aqueous latex composition of the invention is in the form of a mixture of the copolymers. This mixture may for example be a simple aqueous latex blend of the at least one copolymer A and the at least one copolymer B prepared by blending together aqueous latices of separately prepared copolymers. Alternatively the mixture may be made in-situ by forming the at least one copolymer A in the presence of the at least one copolymer B, or vice versa, using a sequential polymerisation process. When more than one copolymer A and/or copolymer B is used, these may be mixed by simple blending, by a sequential polymerisation process, or by a combination of simple blending and sequential polymerisation.

The Tg of a polymer will primarily be determined by the types and amounts of the individual monomer units in the polymer. Accordingly a variety of polymers may readily be prepared having Tg within the ranges specified.

It may be noted that the Tg of a vinylidene chloride copolymer cannot be calculated from a formula; instead it is necessary to determine the Tg of such a copolymer by experiment. Typical examples of Tg verses composition relationships for vinylidene chloride copolymers are given in: "Polyvinylidene Chloride", R A Wessling, Gordon and Breach, Science Publishers 1977.

By an internally plasticising comonomer is in the composition of copolymer A meant a comonomer which gives a homopolymer (when polymerised alone) of very low Tg (preferably $< -40°$ C., more preferably $\leq -50°$ C.) and so provides copolymerised units in a copolymer which(if present in sufficient proportion) tend to cause the polymer to be intrinsically plasticised and thereby have considerably lowered Tg in comparison to a polymer not having such units. Thus the use of such comonomers allows various desired values of Tg to be readily achieved. Suitable plasticising comonomers include certain kinds of alkyl and alkoxyalkyl acrylates such as n-butyl acrylate, 2-ethylhexyl acrylate, n-decyl methacrylate, n-octyl acrylate, 2-ethylbutyl acrylate, n-heptyl acrylate, 2-heptyl acrylate, n-hexyl acrylate, 3-methylbutyl acrylate, n-nonyl acrylate, 2-octyl acrylate, n-propyl acrylate, 1-ethoxyethyl acrylate, 1-ethoxypropryl acrylate, 2-methoxyethyl acrylate, 3-methoxypropyl acrylate and propoxylated acrylates and methacrylates, and other monomers such as ethylene, cis and trans 1,3-butadiene, cis and trans isoprene, cis and trans chloro-prene, 1-decene, 1-pentene, and 1-octene. Of these, n-butyl acrylate and 2-ethylhexyl acrylate are usually preferred internally plasticising comonomers for copolymer A with n-butyl acrylate being particularly preferred.

It is thus apparent that in copolymer A, the polymerised units of the at least one plasticising comonomer can be provided by certain suitable polymerised units within the scope of (a) (i.e from certain of the alkyl acrylates and methacrylates and alkoxyalkyl acrylates and methacrylates having 1 to 12 carbon atoms in the alkyl group as exemplified in the list above) and/or from suitable polymerised units outside the scope of (a).

The composition of copolymer A should be selected to provide a Tg in the range from $-50$ to $<0°$ C. and more preferably in the range from $-40$ to $-5°$ C.

Possible copolymer compositions for A include polymers comprising 10 to 100 weight % of polymerised units (a), 0 to 90 weight % of polymerised units of at least one internally plasticising comonomer other than one or ones forming polymerised units within the scope of (a), 0 to 50 weight % of polymerised units of vinyl chloride, and 0 to 10 weigh % of polymerised units of at least one copolymerisable ethylenically unsaturated acid.

Preferred copolymer compositions for A include copolymers comprising 10 to 70 weight % of polymerised units of vinylidene chloride, 30 to 90 weight % of polymerised units of at least one internally plasticising comonomer, 0 to 50 weight % of polymerised units of vinyl chloride, and 0 to 10 weight % of polymerised units of at least one copolymerisable ethylenically unsaturated acid. Minor amounts of polymerised units of other ethylenically unsaturated monomers may optionally be included in these preferred polymer compositions of A.

The proportion of polymerised units of vinylidene chloride in the above-mentioned preferred copolymer compositions for A is more preferably 20 to 60 weight %.

The proportion of polymerised units of the at least one internally plasticising comonomer in the above-mentioned preferred copolymer compositions for A is more preferably 40 to 80 weight %.

The proportion of polymerised units of vinyl chloride in the above-mentioned preferred copolymer compositions for A is more preferably 0 to 20 weight % and still more preferably 0 to 15 weight %.

The proportion of polymerised units of copolymerisable acid in the above-mentioned preferred copolymer compositions for A is more preferably 0.1 to 8 weight %, still more preferably 0.1 to 5 weight %, and yet more preferably 0.1 to 3 weight %.

The contactibility of the adhesive may sometimes be further improved by causing the molecular weight of A to be lower than would result naturally from the polymerisation to make it. This may readily be achieved by employing a chain transfer agent in the polymerisation reaction. Suitable chain transfer agents include the long chain alkyl mercaptans, e.g. n-octyl mercaptan and t-dodecyl mercaptan; isopropanol; isobutanol; long chain alcohols, e.g. lauryl alcohol and t-octyl alcohol; $CCl_4$, $CH_2Cl_2$, and $CBrCl_3$. The amount used is generally 0.1 to 5%, preferably 0.5 to 2%, based on the total weight of monomeric material used.

The composition of copolymer B should be selected to provide a Tg which is not more than 30° C. Preferably the Tg of B is within the range from $-50$ to 30° C., and more preferably within the range from $-20$ to 30° C.

Preferred copolymer compositions for B are the copolymers comprising 70 to 98 weight % of polymerised units of vinylidene chloride, 2 to 30 weight % of polymerised units (b), and 0 to 10 weight % of polymerised units of at least one copolymerisable ethylenically unsaturated acid. Minor amounts of polymerised units of at least one other ethylenically unsaturated monomer may optionally be included in these preferred polymeric compositions of B.

The proportion of polymerised units of vinylidene chloride in the above-mentioned preferred copolymer compositions for B is more preferably 80 to 95 weight %.

The proportion of polymerised units (b) in the above-mentioned preferred copolymer compositions for B is more Preferably 2 to 20 weight %.

The proportion of polymerised units of copolymerisable acid in the above-mentioned preferred copolymer compositions for B is more preferably 0.1 to 8 weight %, still more preferably 0.1 to 5 weight %, and yet more preferably 0.1 to 3 weight %.

The copolymer B may include polymerised units of at least one internally plasticising comonomer, such as ethylene, cis and trans 1,3-butadiene, cis and trans isoprene, cis and trans chloroprene, 1-decene, 1-pentene and 1-octene, and also certain kinds of alkyl and alkoxyalkyl acrylates and methacrylates as exemplified by the list provided above in respect of copolymer A, in order to readily achieve a desired value for Tg within the defined range. Such alkyl and alkoxyalkyl acrylates and methacrylates as exemplified above fall within the scope of the said alkyl and alkoxyalkyl acrylates and methacrylates having 1 to 12 carbon atoms in the alkyl group which comprise at least one of the comonomers which may be used to form the polymerised units (b) in copolymer B. The copolymer B may of course include polymerised units of at least one monomer within the scope of alkyl or alkoxyalkyl acrylates and methacrylates having 1 to 12 carbon atoms in the alkyl group which is not an internally plasticising comonomer. In some embodiments the copolymer B includes units of at least one comonomer(other than vinylidene chloride)of the non-internally-plasticising type (e.g. Tg> —40° C.) and no units of an internally plasticising comonomer, or vice versa. In other embodiments both types of unit are present.

In copolymer B, the at least one comonomer providing polymerised units (b) (selected from alkyl acrylates and methacrylates having 1 to 12 carbon atoms in the alkyl group, alkoxyalkyl acrylates and methacrylates having 1 to 12 carbon atoms in the alkyl group, vinyl chloride, styrene, acrylonitrile, vinyl acetate, vinyl ethyl ether ethylene, cis and trans 1,3-butadiene, cis and trans isoprene, cis and trans chloroprene, 1-decene, 1-pentene, and 1-octene ether) is preferably at least one comonomer selected from alkyl acrylates and methacrylate having 1 to 12 carbon atoms in the alkyl group and vinyl chloride. Examples of such alkyl acrylates and methacrylates include n-butyl acrylate and methacrylate, sec-butyl acrylate, tert-butyl acrylate, cyclohexyl acrylate, n-dodecyl acrylate and methacrylate, ethyl acrylate and methacrylate, 5-ethyl-2-nonyl acrylate, 2-ethylbutyl acrylate, n-heptyl acrylate, n-hexyl acrylate, isobutyl acrylate and methacrylate, isopropyl acrylate and methacrylate, methyl acrylate and methacrylate, 2-methyl-butyl acrylate, 3-methylbutyl acrylate, n-octyl acrylate and methacrylate, 2-octyl acrylate, 3-pentyl acrylate and methacrylate, n-propyl acrylate and 2-ethylhexyl acrylate and methacrylate. As discussed above, some of these monomers are of the internally plasticising type while others are of the non-internally plasticising type; both types of monomer may be used, either together or alone. Preferably the at least one comonomer selected from said alkyl acrylates and methacrylates having 1 to 12 carbon atoms in the alkyl group and vinyl chloride is at least one of methyl acrylate, 2-ethylhexyl acrylate, and vinyl chloride.

The copolymer A and/or the copolymer B of the present invention optionally has polymerised units of at least one type of comonomer (the amount typically being 0 to 10 weight %) to provide, where present, a partial (in the sense of a small degree of) cross-linking functionality since this may improve cohesive strength further still. The effect on copolymer A, if used alone for bonding, is to improve the creep resistance of the resulting bond although contactability may then be decreased; the addition of copolymer B can then surprisingly sometimes provide a polymer composition which results in improved contactability as well as good creep resistance thereby ameliorating any decrease in contactability caused by the use of the cross-linking monomer. Suitable monomers for providing such cross-linking functionality include multi-functional copolymerisable monomers. The functionality may be of the type which results in A and/or B becoming partially cross-linked during the polymerisation reaction to form it; comonomers providing this type of cross-linking functionality are polyunsaturated monomers examples of which include allyl methacrylate, diallyl maleate, diallyl phthalate and divinyl benzene. Alternatively, the functionality may be of the type which results in A and/or B, or A and B in co-operation (by virtue of A and B having complementary functional groups) becoming partially cross-linked not during polymerisation but subsequent to polymerisation (latent cross-linking) without any external separately added substance either spontaneously at ambient temperature on ageing or more usually under the influence of heat. A further alternative type of functionality is of the type which results in latent cross-linking of A and/or B by the addition of an external separately added substance i.e. a cross-linking agent (e.g. a divalent metal ion such as zinc or zirconium). Examples of comonomers having the above type of cross-linking functionality where latent cross-linking is possible either at ambient temperature on ageing, or by heating, or by virtue of an externally added substance, or by more than one of these possibilities, have functional groups capable of cross-linking by various mechanisms including self cross-linking or mutual cross-linking by different functional groups, both in the polymer chain; examples of comonomers providing this type of cross-linking functionality include comonomers having reactive polar groups such as hydroxyl, thiol, amino, amide, isocyanate, nitrile, carboxy, and epoxide groups. Examples of such comonomers include glycidyl methacrylate and acrylate, methylaminoethyl methacrylate and acrylate, t-butylaminoethyl methacrylate and acrylate, methacrylamide, 4-pentenoguanamine, hydroxylalkyl esters such as hydroxypropyl methacrylate, hydroxyethyl methacrylate and hydroxyethyl acrylate, methacrylonitrile, N-alkoxyalkyl amides such as methoxymethyl methacrylamide and butoxy-methyl acrylamide, and hydroxyalkyl amides such as N-methylol methacrylamide and N-methylol acrylamide, and dicarboxylic acids such as maleic acid. Some comonomers provide both types of functionality (i.e. cross-linking during polymerisation and latent cross-linking), e.g. divinyl ether of 1,4-butendiol, and trimethylol propane triacrylate and trimethacrylate. The at least one monomer to provide a partial cross-linking functionality (if used) is usually used in an amount to provide 0.01 to 10 (particularly 0.01 to 5) weight % of polymerised units.

In copolymers A and B the at least one ethylenically unsaturated copolymerisable acid (if used), which primarily provides an adhesion-promoting functionality, is preferably an ethylenically unsaturated carboxylic acid or a sulphonic acid, such as 2-acrylamide 2-methylpropane sulphonic acid. Particularly preferred acids are aliphatic alpha, beta-unsaturated carboxylic acids and especially acrylic acid; other carboxylic acids of this type which may be used include methacrylic acid, itaconic acid and citraconic acid. Other monomers which provide an adhesion-promoting functionality may be used in conjunction with or in place of the ethylenically unsaturated acid (e.g. in an amount of 0 to 10 weight %). It may be mentioned that the at least one ethylenically unsaturated carboxylic acid can also provide units which impart a latent cross-linking functionality as described above if the composition includes an external cross-linking agent.

The emulsion polymerisations to form the copolymers A and B may be carried out by well-established emulsion techniques; for example, polymerisation in an aqueous medium with the aid of a free-radical initiator and usually in the presence of a surface active agent and in appropriate cases with some monomer feeding during the polymerisation to an initial monomer charge to preserve compositional homogeneity.

The aqueous latex compositions of the invention may be used in contact adhesive applications without the inclusion therein of a tackifying resin thereby considerably simplifying any formulation aspects for the adhesives producer. However, the inclusion of at least one tackifying resin in the aqueous latex composition of the invention (usually in an amount of 5 to 100% by weight, more usually 10 to 60% by weight, based on the dry weight of copolymers A and B) may be advantageous in many cases to improve still further the adhesive performance of the compositions and is generally preferred. This is particularly the case for improving the performance of compositions in which the copolymer A has Tg in the higher part of the claimed range. Suitable tackifying resins known to the art for improving properties such as contactability, cohesive strength and creep behaviour in contact adhesives include phenolic resins (such as heat reactive alkylphenol/formaldehyde resins, hydroxyalkylated alkylphenol/ formaldehyde resins and thermoplastic terpene/phenolic resins), certain rosin esters (e.g. ones derived by esterifying tall oil rosins with glycerol or pentaeryrithritol), hydrogenated rosins and coumarone/idence resins. The aqueous latex compositions of the invention may also include substances such as thickeners, stabilizers, humectants, fillers, surfactants, pigments, dyes, fungicides, coalescing agents, cross-linking agents, and/or other material required for any particular application.

The above substances (if used) may be incorporated or formulated into the latex compositions of the present invention by any suitable technique, e.g. by simple mixing and stirring.

The compositions of the present invention may be used to provide contact adhesion for a variety of substrates, the materials joined either being the same or (more usually) different. Such substrates include wood, paper, various forms of panelling such as plyboard, particleboard, plasterboard, various platics materials, various minerals such as glass, asbestos, carbon fibre, concrete, plaster and ceramics, and metals such as iron, steel and aluminium.

The present invention is illustrated by the following examples; the prefix C in an example denotes a comparative example; unless otherwise specified all parts, percentages, and ratios are on a weight basis.

Contactibility in the examples is assessed by applying two brush coats of the aqueous latex composition (intended to provide the contact adhesive) to unproofed cotton duck (i.e. unproofed canvas), allowing the first brush coat to dry as indicated by a clearness of the adhesive film before applying the second coat. When the second adhesive coat is dry the coated surfaces are brought together under light hand roller pressure to form the adhesive bond the strength of which is then tested immediately as a 25 mm wide strip on an Instron tensile testing machine set at a crosshead speed of 10 cm/minute. By considering the initial bond strength it is possible to determine whether interfilm coalescence has occurred and hence whether or not the adhesive is contactible.

Creep at elevated temperatures or creep resistance unless otherwise specified is determined by preparing a test specimen as for contactibility but making the adhesive bond under a load of 3.5 Kg/cm$^2$ for 60 seconds and ageing for 7 days prior to testing. Creep resistance is assessed by equilibriating the sample at 60° C. and recording the distance peeled or crept in mm/minute under a static load of 1 Kg.

The key to the monomer notation used in the examples is as follows:
VDC vinylidene chloride
AA acrylic acid
EHA 2-ethylhexyl acrylate
VC vinyl chloride
BA n-butyl acrylate
MA methyl acrylate
HEA hydroxyethyl acrylate
AMPS 2-acrylamido - 2-methyl propane sulphonic acid
AN acrylonitrile All the polymers were prepared by conventional emulsion polymerisation in an aqueous medium using a free-radical-yielding initiator and a surface active agent. The solids contents of the latices were in the range 53 to 55%. Tg was determined in each case by differential scanning calorimetry.

EXAMPLES C1 TO C4

Examples C1 and C2 (see Table 1) are examples using aqueous latex compositions containing copolymer A in the absence of copolymer B. Examples C3 and C4 are examples of aqueous latex compositions of copolymers outside the scope of copolymer A by virtue of having Tg $\geq$ 0. The measurement of contactability for these examples show that at Tg's $\geq$ 0 contactability was lost. The low creep resistance which tends to be achieved with copolymer A alone is evident. All the copolymers were amorphous as would be expected from their composition (yielding clear flexible films).

TABLE 1

| Example No. | Polymer A Composition | Tg °C. | Contactability (Initial Bond Strength) Kg | Creep Resistance mm/min |
|---|---|---|---|---|
| C1 | VDC/EHA/AA 28.0/70.0/2.0 | −35 | 3.1 | 88 |
| C2 | VDC/BA/AA 28.7/69.3/2.0 | −13 | 2.2 | 68 |
| C3 | VDC/BA/AA 48.1/49.9/2.0 | 0 | 0 | — |
| C4 | VDC/BA/AA 60.5/37.5/2.0 | +6 | 0 | — |

EXAMPLES C5 AND C8

Examples C5 to C8 (Table 2) are examples of using aqueous latex compositions containing crystalline copolymer B in the absence of copolymer A and show that these polymers do not impart contactability. The copolymers exhibited 20–30% crystallinity (as assessed by the intensity of a band in the infra-red spectrum known to be characteristic of crystalline VDC polymers), yielding hard crumbly brittle films even where Tg was less than room temperature.

TABLE 2

| Example No. | Copolymer B Composition | Tg °C. | Contactability (Initial Bond Strength) Kg |
|---|---|---|---|
| C5 | VDC/MA/AA/HEA/AMPS 84.2/9.3/2.8/2.8/0.9 | +14 | 0 |
| C6 | VDC/VC/EHA/AA 86.0/8.4/3.6/2.0 | −2 | 0 |
| C7 | VDC/MA/AA 90.8/8.2/1.0 | +14 | 0 |
| C8 | VDC/AN/MA/AA 90.5/5.0/4.0/0.5 | +16 | 0 |

EXAMPLES 9 TO 15

Examples 9 to 15 (Table 3) are examples according to the invention of aqueous latex compositions containing copolymer A blended with copolymer B and demonstrate the improved creep resistance obtained with each blend in comparison with the copolymer A component of that blend alone whilst exhibiting acceptable contactability. The polymers are identified from the previous example numbers.

TABLE 3

| Example No. | Copolymer Blend A:B | Ratio A:B (ratio of latex solids) | Contactability (Initial Bond Strength) Kg | Creep Resistance mm/min |
|---|---|---|---|---|
| 9 | C1:C6 | 75:25 | 3.0 | 20 |
| 10 | C1:C5 | 75:25 | 4.2 | 12 |
| 11 | C1:C5 | 50:50 | 1.6 | 10 |
| 12 | C2:C5 | 75:25 | 2.8 | 20 |
| 13 | C1:C7 | 75:25 | 2.4 | 16 |
| 14 | C1:C8 | 75:25 | 2.3 | 33 |
| 15 | C2:C6 | 40:60 | 2.1 | 26 |

EXAMPLES 16 TO 18

Examples 16 to 18 (Table 4) are examples of blends of aqueous latices of copolymer A and copolymer B to which a tackifying resin, Ucar Phenolic Resin dispersion BKUA 2370 manufactured by Union Carbide, has been added by simple mixing and stirring. The examples demonstrate a maturing of the adhesive bond on ageing for 7 days.

TABLE 4

| Example No. | Copolymer Blend A:B | Ratio A:B (ratio of latex solids) | Resin (% on Polymer Blend) | Contactability (Initial Bond Strength) Kg | Bond Strength After 7 Days Kg |
|---|---|---|---|---|---|
| 16 | C2:C6 | 75:25 | 33 | 5.5 | 6.6 |
| 17 | C2:C5 | 75:25 | 33 | 2.4 | 4.6 |
| 18 | C2:C5 | 66.6:33.4 | 33 | 1.7 | 3.6 |

EXAMPLES C19 AND 20

Example C19 is an example of an aqueous latex of a single copolymer having a very similar average composition (VDC/VC/EHA/BA/AA; 42.7/0.9/1.0/53.4/2.0) as a 75:25 latex blend (ratio of latex solids) of the compositions denoted by Examples C2 and C6, this blend being denoted by Example 20. The Tg of the copolymer of C19 was −3° C. The value of contactability of Example C19 was found to be 1.9 Kg and moreover 100% interfilm coalescence did not occur. By contrast, the contactability of Example 20 was 5.0 Kg (with full interfilm coalescence).

EXAMPLES 21 to 25

These Examples (Table 5) are intended to show the beneficial effect that can be achieved when copolymer A and copolymer B include polymerised units that provide a latent cross-linking functionality caused by the presence of an external cross-linking agent. Example 21, which is still according to the invention, exemplifies an aqueous latex of a blend of the copolymers of Examples 2 and 6; both copolymers include polymerised units of acrylic acid but the composition does not include an external cross-linking agent so that these units do not impart a latent cross-linking functionality. In Examples 22 to 25, the same copolymer blend is used but the composition also includes an added cross-linking agent (as indicated). Consequently in Examples 22 to 25, the acrylic acid units Provide a latent cross-linking functionality and the beneficial effect on creep resistance is readily evident.

TABLE 5

| Example No. | Copolymer Blend A:B | Ratio A:B (ratio of latex solids) | Cross-linking Agent in Composition and amount % on polymer solids | Contactability (initial Bond Strength Kg) | Creep Resistance mm/min |
|---|---|---|---|---|---|
| 21 | C2:C6 | 75:25 | None | 5.0 | 16.7 |
| 22 | C2:C6 | 75:25 | zinc oxide (0.29) | 3.7 | 12.5 |
| 23 | C2:C6 | 75:25 | zinc oxide (0.56) | 3.0 | 5.2 |
| 24 | C2:C6 | 75:25 | zirconium oxide (2.13) | 2.9 | 9.8 |
| 25 | C2:C6 | 75:25 | zirconium oxide (4.26) | 4.0 | 4.1 |

We claim:

1. An aqueous latex composition comprising at least one copolymer A and at least one copolymer B characterised in that:

A is an amorphous copolymer comprising polymerised units (a) of at least one monomer selected from alkyl acrylates and methacrylates having 1 to 12 carbon atoms in the alkyl group, alkoxyalkyl acrylates and methacrylates having 1 to 12 carbon atoms in the alkyl group, vinylidene chloride, acrylonitrile, styrene, vinyl acetate, and vinyl ethyl ether, said copolymer A including units of at least one internally plasticising comonomer, and which copolymer has a Tg in the range −50 to <0° C.; and B is a crystalline copolymer comprising polymerised units of vinylidene chloride; and which copolymer has a Tg which is not more than 30° C.; and wherein the dry weight ratio of the at least one copolymer A: the at least one copolymer B is from 95:5 to 10:90, and wherein said composition provides contactable layers after drying.

2. An aqueous latex composition according to claim 1 characterized in that at least one of said at least one copolymer A in said composition comprises polymerised units of vinyl chloride.

3. An aqueous latex composition according to either claim 1 or claim 2 characterised in that at least one of said at least one copolymer A in said composition comprises polymerised units of at least one copolymerisable ethylenically unsaturated acid.

4. An aqueous latex composition according to any one of the preceding claims characterised in that said at least one copolymer B comprises polymerised units of vinylidene chloride and polymerised units (b) of at least one comonomer selected from alkyl acrylates and methacrylates having 1 to 12 carbon atoms in the alkyl group, alkoxyalkyl acrylates and methacrylates having 1 to 12 carbon atoms in the alkyl group, vinyl chloride, styrene, acrylonitrile, vinyl acetate, vinyl ethyl ether, ethylene, cis and trans 1,3-butadiene, cis and trans isoprene, cis and trans chloroprene, 1-decene, 1-pentene and 1-octene.

5. An aqueous latex composition according to any one of the preceding claims characterised in that at least one of said at least one copolymer B in said composition comprises polymerised units of at least one copolymerisable ethylenically unsaturated acid.

6. An aqueous latex composition according to any one of the preceding claims characterised in that the dry weight ratio of the at least one copolymer A: the at least one copolymer B is from 90:10 to 10:90.

7. An aqueous latex composition according to any one of the preceding claims characterised in that the Tg of the at least one copolymer A is in the range $-40$ to $-5°$ C.

8. An aqueous latex composition according to any one of the preceding claims characterised in that the at least one copolymer A comprises 10 to 100 weight of polymerised units (a), 0 to 90 weight % of polymerised units of at least one internally plasticising comonomer other than one or ones forming polymerised units within the scope of (a), 0 to 50 weight % of polymerised units of vinyl chloride, and 0 to 10 weight % of at least one copolymerisable ethylenically unsaturated acid.

9. An aqueous latex composition according to any one of the preceding claims characterised in that the at least one copolymer A comprises 10 to 70 weight % of polymerised units of vinylidene chloride, 30 to 90 weight % of polymerised units of at least one internally plasticising comonomer, 0 to 50 weight % of polymerised units of vinyl chloride, and 0 to 10 weight % of polymerised units of at least one copolymerisable ethylenically unsaturated acid.

10. An aqueous latex composition according to claim 9 characterised in that the proportion of polymerised units of vinylidene chloride in copolymer A is 20 to 60 weight %.

11. An aqueous latex composition according to either claim 9 or claim 10 characterised in that the proportion of polymerised units of said at least one internally plasticising comonomer in copolymer A is 40 to 80 weight %.

12. An aqueous latex composition according to any one of claims 9 to claims 11 characterised in that the proportion of polymerised units of vinyl chloride in copolymer A is 0 to 20 weight %.

13. An aqueous latex composition according to any one of claims 9 to 12 characterised in that the proportion of polymerised units of said at least one copolymerisable ethylenically unsaturated acid in copolymer A is 0.1 to 8 weight %.

14. An aqueous latex composition according to any one of the preceding claims characterised in that the polymerised units of at least one internally plasticising comonomer in copolymer A are derived from n-butyl acrylate.

15. An aqueous latex composition according to any one of the preceding claims characterised in that the copolymer A has been prepared in the presence of a chain transfer agent.

16. An aqueous latex composition according to any one of the preceding claims characterised in that the Tg of the at least one copolymer B is in the range $-50$ to $30°$ C.

17. An aqueous latex composition according to any one of claims 4 to 16 characterised in that the at least one copolymer B comprises 70 to 98 weight % of polymerised units of vinylidene chloride, 2 to 30 weight % of polymerised units (b), and 0 to 10 weight % of polymerised units at least one copolymerisable ethylenically unsaturated acid.

18. An aqueous latex composition according to claim 17 characterised in that the proportion of polymerised units of vinylidene chloride in copolymer B is 80 to 95 weight %.

19. An aqueous latex composition according to either claim 17 or claim 18 characterised in that the proportion of polymerised units (b) in copolymer B is 2 to 20 weight %.

20. An aqueous latex composition according to any one of claims 17 to 19 characterised in that the proportion of polymerised units of the at least one copolymerisable ethylenically unsaturated acid in copolymer B is 0.1 to 8 weight %.

21. An aqueous latex composition according to any one of the preceding claims characterised in that the at least one copolymer B includes polymerised units of at least one internally plasticising comonomer.

22. An aqueous latex composition according to any one of the preceding claims characterised in that the at least one copolymer B includes polymerised units of at least one comonomer(other than vinylidene chloride)- which comonomer is not an internally plasticising comonomer.

23. An aqueous latex composition according to any one of claims 4 to 22 characterised in that the polymerised units (b) in copolymer B are derived from at least one monomer selected from alkyl acrylates and methacrylates having 1 to 12 carbon atoms in the alkyl group and inyl chloride.

24. An aqueous latex composition according to any one of the preceding claims characterised in that copolymer A and/or copolymer B comprises polymerized units of at least one copolymerisable ethylenically unsaturated acid which acid is an ethylenically unsaturated carboxylic acid or sulphonic acid.

25. An aqueous latex composition according to claim 24 characterised in that the acid is an aliphatic alpha, beta-unsaturated carboxylic acid.

26. An aqueous latex composition according to any one of the preceding claims characterised in that the copolymer A and/or the copolymer B comprises polymerised units of at least one type of comonomer to provide a partial cross-linking functionality.

27. An aqueous latex composition according to claim 26 characterised in that said polymerised units to provide a cross-linking functionality effect cross-linking during the polymerisation to form the copolymer.

28. An aqueous latex composition according to claim 26 characterised in that said polymerised units to provide a cross-linking functionality provide a latent cross-linking functionality.

29. An aqueous latex composition according to claim 28 characterised in that the latent cross-linking provided by said polymerised units requires the inclusion of a cross-linking agent in the composition.

30. An aqueous latex composition according to any one of the preceding claims characterised in that said latex composition includes at least one tackifying resin, which tackifying resin has been added in the form of a dispersion.

31. The use of an aqueous latex composition according to any one of the preceding claims as a contact adhesive-forming composition.

* * * * *